United States Patent [19]

Sano

[11] Patent Number: 4,702,156
[45] Date of Patent: Oct. 27, 1987

[54] VENTILATOR GRILL AND METHOD FOR ASSEMBLING THE SAME

[75] Inventor: Yosiaki Sano, Fuji, Japan

[73] Assignee: Nihon Plast Co., Ltd., Shizuoka, Japan

[21] Appl. No.: 799,075

[22] Filed: Nov. 18, 1985

[30] Foreign Application Priority Data

Nov. 19, 1984 [JP] Japan ............................ 59-244270
Nov. 19, 1984 [JP] Japan ............................ 59-244271
Nov. 26, 1984 [JP] Japan ............................ 59-249410

[51] Int. Cl.$^4$ ............................................ F24F 13/15
[52] U.S. Cl. .................................. 98/40.24; 264/242; 264/250
[58] Field of Search ............... 98/2, 40.24, 40.26, 98/40.27, 110, 121.2; 264/242, 250

[56] References Cited

U.S. PATENT DOCUMENTS

| | | | |
|---|---|---|---|
| 1,850,822 | 3/1932 | Young | 98/40.26 X |
| 2,152,447 | 3/1939 | Wheeler | 98/110 |
| 2,887,943 | 5/1959 | Goettl | 98/110 |
| 2,948,211 | 8/1960 | Melgaard | 98/40.26 |
| 3,680,470 | 8/1972 | Neece | 98/121.2 X |
| 4,414,170 | 11/1983 | Sano | 98/121.2 X |
| 4,546,695 | 10/1985 | Ouchi et al. | 98/121.2 |

FOREIGN PATENT DOCUMENTS 54-26266 9/1979 Japan .

*Primary Examiner*—Harold Joyce
*Attorney, Agent, or Firm*—Armstrong, Nikaido, Marmelstein & Kubovcik

[57] ABSTRACT

A ventilator grill comprises an outer frame made of synthetic resin having an inlet opening and outlet opening, at least one stationary vane extending across an interior of the outer frame, a plurality of through holes provided in each half of the outer frame, arcuate recess provided in an end face of the respective stationary vane, which opposes the inlet opening of the outer frame, and which has a circular arc, and at least one movable vane extending across the stationary vane, which is provided at opposite sides thereof in opposing side walls of the halves of the outer frame with journal shafts received within the through holes for permitting the movable vane to swing about an axis of swing extending through a center of the circular arc of the arcuate recess, and which is provided at one end portion thereof toward the inlet opening of the outer frame with a portion which is in sliding contact with the arcuate recess.

11 Claims, 14 Drawing Figures

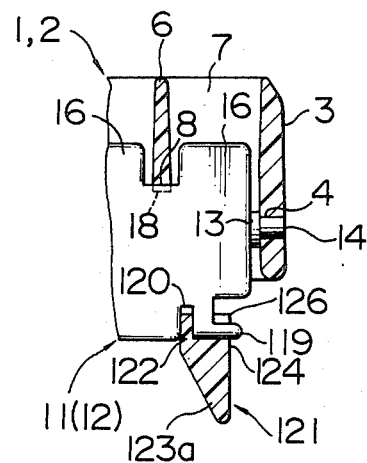
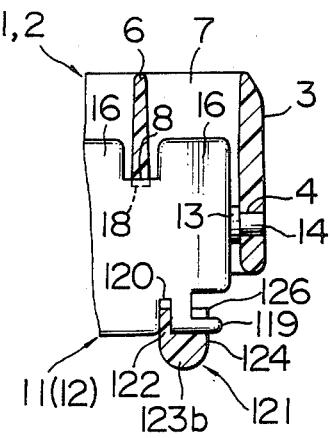
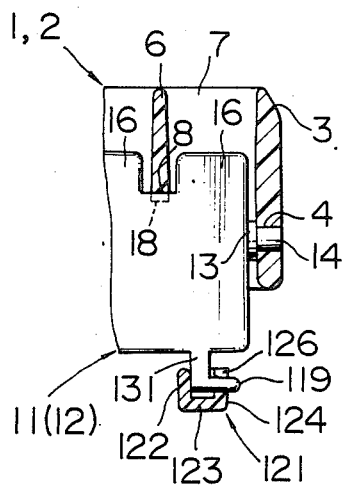

VENTILATOR GRILL AND METHOD FOR ASSEMBLING THE SAME

FIELD OF THE INVENTION AND RELATED ART STATEMENT

The present invention relates to a ventilator grill for use in an air outlet of an air-conditioner or ventilator and to a method for assembling the same, and more particularly to a ventilator grill and a method for assembling same, wherein a molding step of movable vanes provided swingably in an outer frame and an assembling step of an outer frame and the movable vanes may be simultaneously carried out.

As disclosed in Japanese Patent Examined Publication No. 26266/79, it is known to simultaneously carry out a molding step of movable vanes and an assembling work of the movable vanes and an outer frame. In the publication, the outer frame made of synthetic resin and having through holes or openings in opposite side walls is inserted into a cavity of a mold which uses such through holes of the outer frame as a part of the cavity surface, and a synthetic resin having non-bondability against the synthetic resin of the outer frame and having a lower melting point is injected into the cavity to mold the movable vanes. At the same time, shafts to be engaged rotatably with the through holes, of the side walls, used as the part of the cavity surface are integrally formed with both ends of each of the movable vanes.

However, according to the above-described art, in the case where stationary vanes directed in a direction perpendicular to the movable vanes are needed, after the movable vanes have been assembled and molded with the outer frame, the stationary vanes which have been molded independently must be assembled into the outer frame. Therefore, a high cost is needed to mold and assemble the stationary vanes. In addition, a structure for holding the stationary vanes in the outer frame is needed to cause a limit for special problem.

On the other hand, as disclosed in Japanese Utility Model Unexamined Publication No. 162057/77 or Japanese Utility Model Examined Publication No. 9802/69, a ventilator grill is known in which a cooperating rod for cooperating the respective movable vanes with each other is molded independently of the movable vanes and pin portions formed in the respective movable vanes are engaged with connecting portions formed in the cooperating rod.

However, in such a case that the cooperating rod is independently molded, a distal end of each pin portion must be enlarged in size so as to prevent the connecting portions of the cooperating rod from being pulled apart from the respective movable vanes in the axial direction. In assembling and molding the ventilator grill where the outer frame and the respective movable vanes are simultaneously assembled, due to the relation in mold release upon the assembling and molding, it is impossible to increase a diameter of a distal end of each pin portion of each movable vane to form a flanged head.

OBJECT AND SUMMARY OF THE INVENTION

An object of the invention is to provide a ventilator grill capable of assembling and molding movable vanes in an outer frame after integrally molding the outer frame and stationary vanes.

Another object of the present invention is to provide a method of assembling and molding a ventilator grill, comprising a step of assembling and molding movable vanes in an outer frame after integrally molding the outer frame and stationary vanes.

A still another object of the invention is to provide a ventilator grill which is easy to produce and is advantageous in assembling and molding by simplifying a pull-apart preventing means for preventing the connecting portions from falling apart from the pin portions of the movable vanes in the axial direction.

According to the invention, the rear side edge surfaces of the stationary vanes and the through holes in the side walls may be used as a part of the cavity surface of the mold for molding of the movable vanes.

According to the invention, a ventilator grill comprises an outer frame made of a synthetic resin and molded therein of stationary vanes, and movable vanes made of a synthetic resin and provided rotatably in an interior of the outer frame, the stationary vanes being perpendicular to the movable vanes. The ventilator grill of this invention is characterized in that a recess portion having an arcuate shape having a center on a rotational axis of each movable vane is formed at an edge portion of the stationary vane intersecting with the movable vane, so that the edge portion of the movable vane is rotatable or swingable around a center of the rotational central axis in the recess portion.

Since the recess portion of the stationary vane is in the form of an arc having a center on a rotational axis of the movable vane, even in case of the increased thickness of the movable vane, the rotation of the movable vane is free without any hindrance.

Also, according to the invention, in the ventilator grill, a plurality of the movable vanes are provided; a cooperating rod is provided for cooperating the plurality of movable vanes with each other; pin portions are formed in parallel to a rotation axis of each movable vane in each movable vane; a plurality of connecting portions are formed in the cooperating rod for supporting and engaging the pin portions of the respective movable vanes for rotation thereof; each connecting portion of the cooperating rod is engaged with the pin portion of each movable vane so as to cooperate the respective movable vanes with each other; a cooperating rod pull-apart preventing retainer is formed on an extension line of the proximal end of each pin portion in each movable vane; and the retainer engagement portion provided in the cooperating portion is engaged with the movable vane slidably in the longitudinal direction of the cooperating rod, thereby perform the prevention of the removal of the connecting portion from each pin portion.

According to the present invention, a method for assembling a ventilator grill which includes an outer frame made of one synthetic resin having two pairs of side walls, the side walls of each of the pairs being substantially parallel to each other, at least one stationary vane extending between the side walls of one of the two pairs and being substantially parallel to the side walls of the other pair, and a series of through holes provided in each side wall of the other pair, the method comprises the following steps: molding the outer frame; disposing the outer frame within a mold half to cooperate therewith to form a complete mold having a molding cavity a part of which is defined by a part of rear side edge surface of the stationary vane and the through holes in the side walls; and injecting another synthetic resin into the molding cavity, which has a melting point lower than that of the one synthetic resin, thereby forming at least one movable vane extending across the stationary vane and journal shafts projecting from each of opposite sides of the movable vane into the through holes for permitting the movable vane to swing about an axis thereof.

According to the invention, an edge portion of the movable vane provided in a direction perpendicular to the stationary vane is opposed with a part of rear edge surface of the stationary vane of the outer frame, to thereby substantially eliminate a space between the edge surface of the stationary vane and the opposing portion of the movable vane. Accordingly, the edge surface of the stationary vane of the outer frame is used as a part of the cavity of mold for molding the movable vane, thereby forming a part of the edge portion of the movable vane. Also, since there is no mold between the edge surface of the stationary vane and the opposing portion of the movable vane, even if the stationary vane is molded integrally with the outer frame, it is possible to release the product from the mold upon the assembling and molding of the movable vane. It is therefore unnecessary to mold the stationary vane independently and to assemble it with the outer frame unlike the prior art. Thus, a cost needed to assemble and mold the stationary vanes is eliminated. In addition since a structure for holding the stationary vane to the outer frame is unnecessary, there is little limit to an aesthetic design of the apparatus.

According to the invention, the cooperating rod for cooperating a plurality of parallel movable vanes provided rotatably or swingably in an interior of the outer frame is molded to be separated from the respective movable vanes, and the connecting portions of the cooperating rod are engaged with the pin portions of the respective vanes. Accordingly, even if, for example, the cooperating rod is long by increasing an interval of the movable vanes or increasing the number of the movable vanes, a parallelism of the movable vanes may be ensured. The prevention of axial removal of the connecting portions from the respective pin portions is attained by the retainer in the movable vanes and the retainer engagement portion in the cooperating rod. Accordingly, it is unnecessary to increase a diameter of each distal end of each pin portion. Thus, a part of the outer frame having stationary vanes integrally molded thereto may be used as a part of the cavity surface of the mold to form the respective movable vanes. At the same time, upon the molding of the respective movable vanes, it is possible to release the product including the respective vanes from the mold. The cost for assembling the movable vanes may be dispensed with by such assembling and molding.

The foregoing objects, features and advantages of the present invention will become more apparent by the following description.

BRIEF DESCRIPTION OF THE DRAWINGS

FIGS. 12 to 14 are fragmentary cross-sectional views showing modifications of the ventilator grill shown in FIG. 7.

DETAILED DESCRIPTION OF THE PREFERRED EMBODIMENTS

Figure 1:
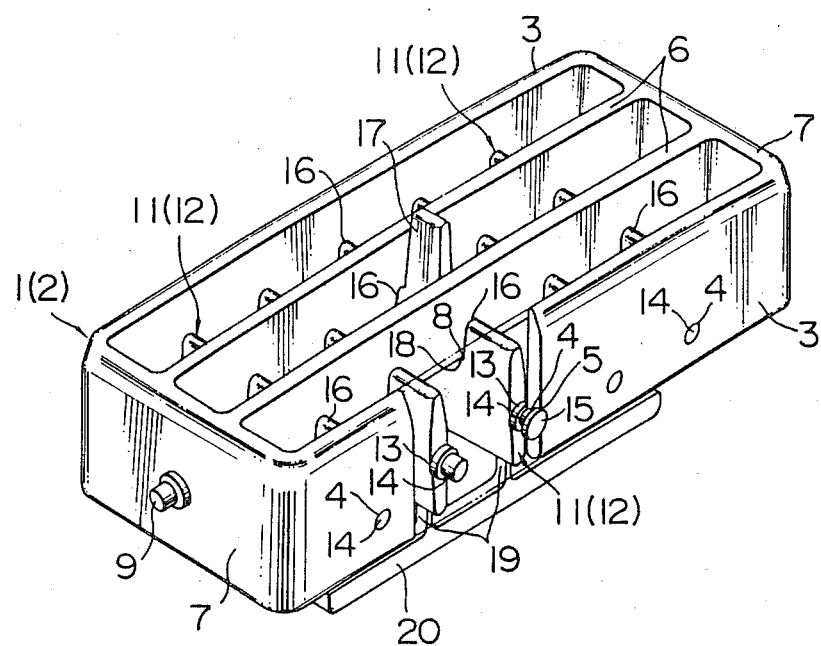
FIG. 1 is a partially fragmentary perspective view showing a ventilator grill in accordance with an embodiment of the invention.
Figure 2:
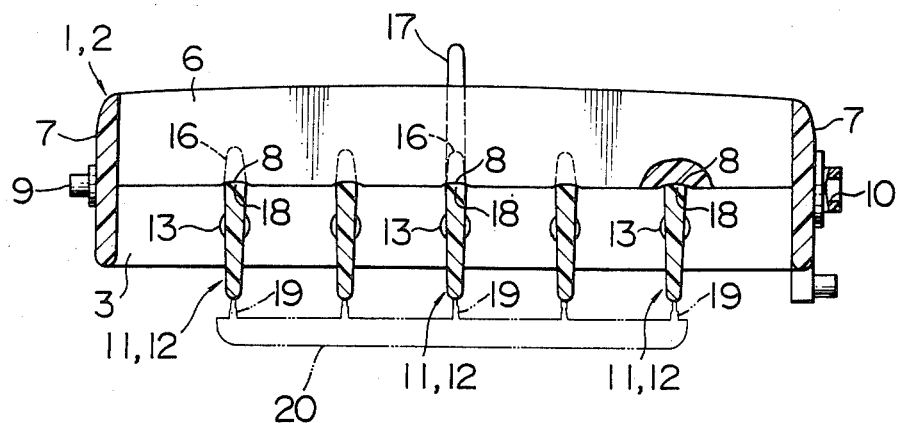
FIG. 2 is a longitudinal sectional view of the ventilator grill in FIG. 1.
Figure 3:
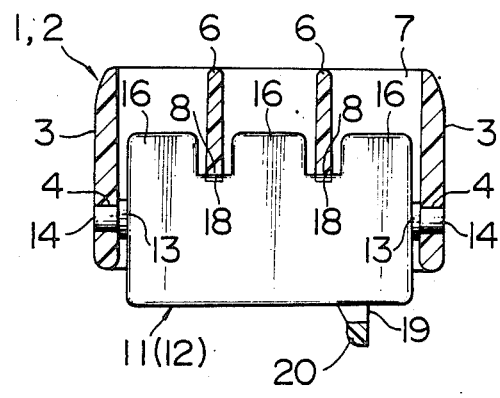
FIG. 3 is a cross-sectional view of the ventilator grill shown in FIG. 1.

FIGS. 1 to 3 show a ventilator grill for use in an air outlet port for ventilation of a passenger room of an automotive vehicle.

An outer rectangular frame 1 is made of acrylonitrile butadiene styrol copolymer resin (hereinafter referred to as ABS resin). The outer frame 1 is in the form of a tubular or rectangular shape whose front and rear faces are opened. In each of a pair of upper and lower horizontal outer walls 3, five axial through holes or openings 4 are formed equidistantly at a predetermined interval in the longitudinal direction. The through holes 4 formed vertically (in a set state) in the upper and lower outer walls 3 are arranged coaxially with each other. Greater diameter portions 5 are formed at outer end portions of a pair of upper and lower central through holes 4, that is, at outside portion of the outer side walls 3. On a front side of the inside of the upper and lower outer side walls 3 in which the through holes 4 are formed, two horizontal stationary vanes 6 are provided in parallel with the outer side walls 3 in a predetermined interval in the vertical direction. The stationary vanes 6 are formed integrally with front portions of inner surfaces of right and left opposing vertical outer walls 7 of the outer frame 1. On the rear side edge portions of the respective stationary vanes 6, there are formed five arcuate recesses 8 each having a circular center on a center line of each through hole 4.

A support or pivot shaft 9 and a shaft support sleeve 10 extend coaxially in a horizontal direction from outer central portions of the left and right side walls 7 of the outer frame 1. By the pivot shaft 9 and the shaft support sleeve 10, the outer frame 1 may be mounted on the air outlet (not shown) to be swingable up and down.

Substantially rectangular movable vanes 11 extending in the vertical direction (in FIG. 1) are made of polypropylene resin (hereinafter referred to as PP resin) which has a low melting point but no bondability against the ABS resin of the outer frame 1. A pair of flanged portions 13 are formed coaxially vertically and integrally with each vane 11 at central portions of upper and lower edge portions of each of the five movable vanes 11. A journal shaft 14 is formed vertically and integrally with a central portion of each flanged portion 13. Each shaft 14 is rotatably inserted into each through hole 4 of each outer side wall 3 of the outer frame 1. With such a structure, each movable vane 11 is swingable in the right and left direction in the inner rear space of the outer frame 1 and is held vertically at a predetermined interval in the right and left direction. At the outer end portions of the paired shafts 14 of the central movable vane 11, that is, at the outer side portions of the outer side walls 3, there are formed flanged portions 15 having larger diameter portions rotatably held at the greater diameter portions 5 of the through holes 4 but prevented from being separated apart therefrom.

Three extensions 16 are formed extending forwardly from a front edge of each movable vane 11 and at a predetermined interval with respect to each stationary vane 6 of the outer frame 1. An operating member 17 extends to the front space of the outer frame 1 integrally from the front edge of the central extension 16 of the central movable vane 11.

Also, at the front edge of each movable vane 11, each opposing portion 18 to the associated arcuate recess 8 of each stationary vane 6 of the outer frame 1 is formed in an arcuate shape defined by a circle having a center on a center line of each through hole 4 and shaft 14 in the same manner as in the arcuate recesses 8. Since a rotational locus or path of each opposing portion 18 is identical with a surface shape of each arcuate recess 8, even if the opposing portion 18 is held in intimate contact with the recess 8, each movable vane 11 may be rotated without any difficulty. Under the condition that each opposing portion 18 is opposed to each recess 8, each movable vane 11 is held in parallel with the right and left outer side walls 7 of the outer frame 1.

A rear edge of each movable vane 11 is connected to a cooperating rod 20 through a thin resin hinge portion 19 so that the movable vanes 11 are integrally connected at a predetermined interval. Each movable vane 11 constitutes a part of a parallelepiped link mechanism so that the movable vanes 11 are rotated while being always in parallel with each other.

A method of assembling and molding the above-described ventilator grill will now be explained.

Figure 4:
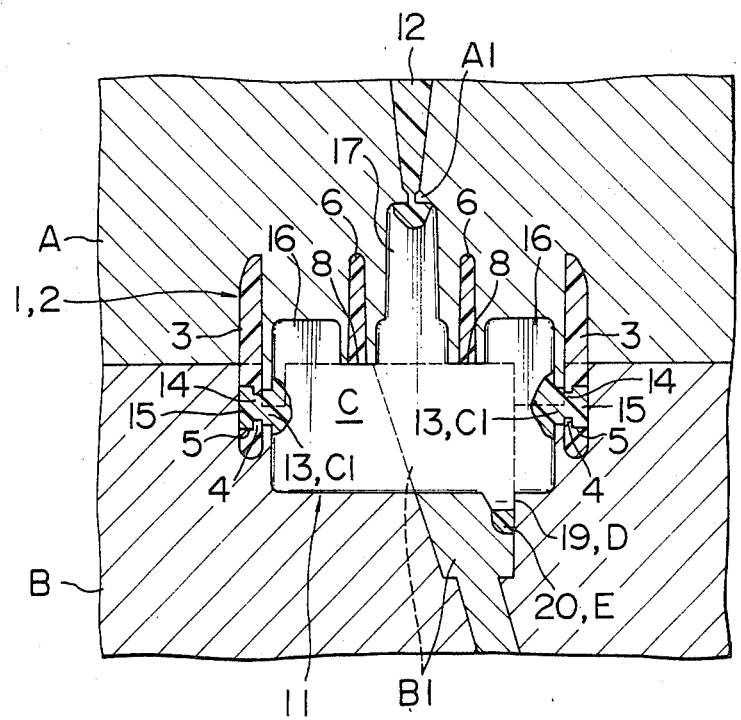
FIG. 4 is a cross-sectional view of molds in a molding and assembling state of the ventilator grill shown in FIG. 1.

FIG. 4 shows a state wherein each movable vane 11 is injection molded of PP resin within mold A+B, and simultaneously, each movable vane 11 is assembled with the outer frame which has been injection molded, in advance, of ABS resin 2.

The outer frame 1 injection molded of ABS resin 2 is inserted in one of the mold halves A and B, and then the mold halves are closed in position.

In the mold A+B, five cavities C for molding the respective movable vanes 11 (including the flanged portions 13, the extensions 16 and the operating member 17 of the central movable vane 11) are formed in parallel with the outer side walls 7 of the outer frame 1. Each recess 8 of each stationary vane 6 is exposed at the upper end of each cavity C. Portions $C_1$, for molding the flanged portions 13, of both side ends of each cavity C are in communication with the through holes 4 (including the greater diameter portion 5 of the central through hole) of the outer side wall 3 of the outer frame 1. The recesses 8 of the respective stationary vanes 6 of the outer frame 1 and the through holes 4 of the outer side walls 3 of the outer frame 1 are used as parts of cavity surfaces of the mold A+B. Incidentally, a parting line of the mold halves A and B is located on the center lines of the portions $C_1$ of the cavity C for releasing the flanged portions 13.

The lower ends of the respective cavities C are communicated with each other through hinge molding portions D for molding the hinge portions 19 by a cooperating rod molding portion E for molding the cooperating rod 20.

A gate $A_1$ is provided in the mold half A and a slant slide core $B_1$ is provided in the mold half B.

With such an arrangement, when the PP resin 12 which has no bondability against the ABS resin 2 of the outer frame 1 and which has a lower melting point than that of the ABS resin 2 is injected from the gate $A_1$ into the respective cavities C, the respective movable vanes 11 (including the flanged portions 13, the extensions 16 and the operating rod 17 of the central movable vane 11) are molded. Furthermore, the PP resin 12 is pressingly inserted into the through holes 4 (including the greater diameter portion 5 of the central through hole 4) from the respective cavities C so that the shafts 14 (including the flanged portions 15 of the shafts 14 of the central movable vane 11) are integrally molded. Simultaneously, the PP resin 12 is pressingly inserted into the hinge molding portions D and the cooperating rod molding portion E from the respective cavities C so that the resin hinge portions 19 and the cooperating rod 20 are molded integrally with the respective movable vanes 11. Through such steps, the ventilator grill shown in FIGS. 1 to 3 is molded.

When the mold halves A and B are separated from each other after the injected PP resin 12 has been solidified, the ventilator grill is released from the mold half A and the PP resin 12 is cut at the gate $A_1$ portion. Subsequently, when the slant slide core $B_1$ is raised obliquely, the ventilator grill is released apart from the mold half B.

In the thus assembled and molded ventilator grill, due to shrinkage of the PP resin 12 after the molding, gaps are formed between outer surfaces of the shafts 14 (including the flanged portions 15 of the shafts 14 of the central movable vane 11) and inner surfaces of the through holes (including the larger diameter portion 5 of the central through hole 4) and the arcuate opposing portions 18 of the respective movable vanes 11 and the arcuate recesses 8 of the stationary vanes 6 of the outer frame 1, respectively. Therefore, there is no hindrance in rotation of the respective movable vanes 11. In addition, the end faces of the flanged portions 15 of the shafts 14 of the central movable vane 11 are held in press contact with the side faces of the greater diameter portions 5 of the central through holes 4 of the outer side walls 3 of the outer frame 1 to thereby impart a suitable resistive rotational torque to the respective movable vanes 11.

In the assembling method of the ventilator grill, one of the mold halves A may be used not only for molding the respective movable vanes 11 and the like but also the outer frame 1. For example, as shown in Japanese Patent Unexamined Publication No. 70627/82, after the outer frame 1 has been molded in a first position by means of the mold half A and a third mold half (not shown), the mold halves are separated from each other so as to release the outer frame 1 apart from the mold while the outer frame 1 is left in the mold half A, and subsequently, after the mold half A is turned to a second position so as to oppose the mold half B, the mold halves A and B are closed to thereby mold the respective vanes 11 and the like.

Figure 5:
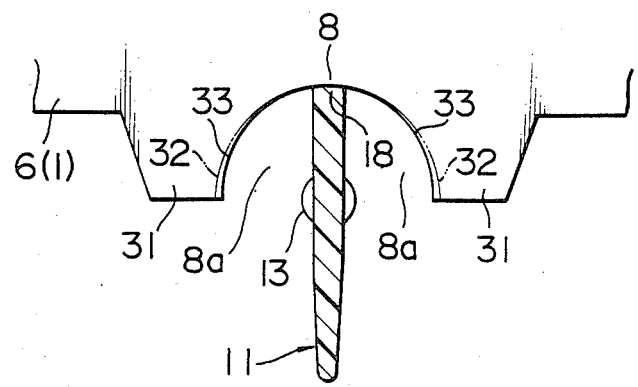
FIGS. 5 and 6 are in larged cross sectional views showing modifications of the ventilator grill shown in FIG. 1.

FIG. 5 shows a modification of the wind deflecting apparatus. Engaging members 31 are formed integrally with both sides of the arcuate recess 8 of each stationary vane 6 of the outer frame 1. Other recesses 8a are formed extending from the recess 8 and are formed in the respective engaging members 31. Each recess 8a is formed to gradually enter into the rotational locus or path 32 of the front edge of the opposing portion 18 of the movable vane 11 with distance from the central recess 8 to form an eccentric arc. Thus, frictional sliding portions 33 are formed. When the movable vane 11 is rotated from the position shown in FIG. 5, a restoration force applied to the movable vane 11 from the cooperating rod 20 and the hinge portions 19 is restrained or regulated by the friction between the opposing portion 18 and the frictional sliding portions 33, thereby holding the movable vanes 11 at any desired position in a stable manner.

Figure 6:
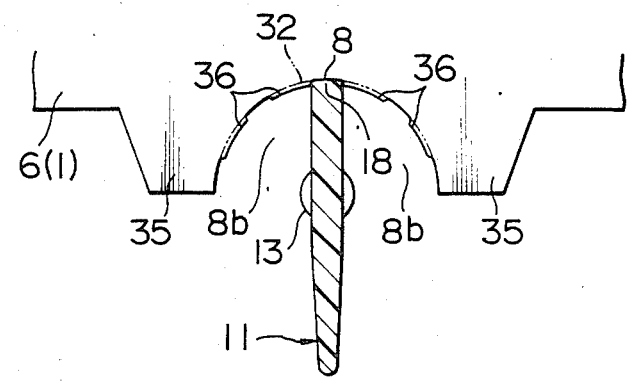
Figure 7:
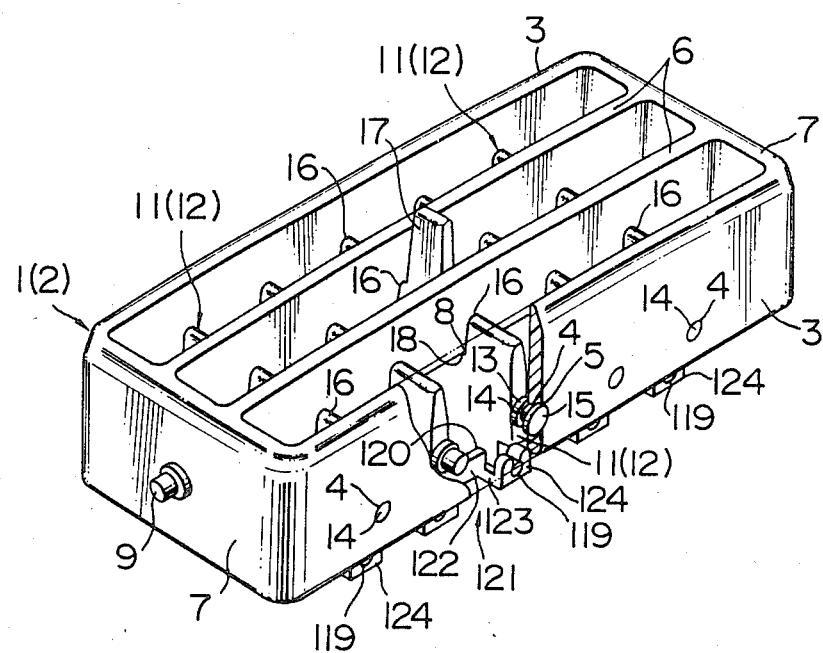
FIG. 7 is a partially fragmentary perspective view showing another ventilator grill in accordance with the present invention.
Figure 8:
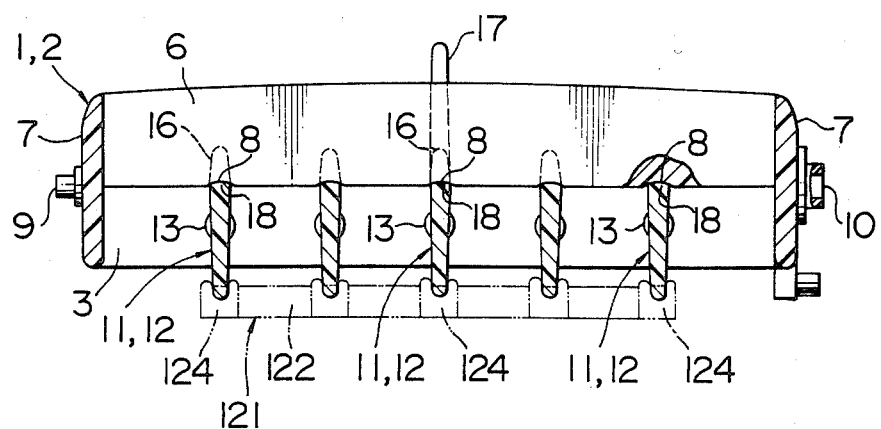
FIG. 8 is a longitudinal sectional view of the ventilator grill shown in FIG. 7.
Figure 9:
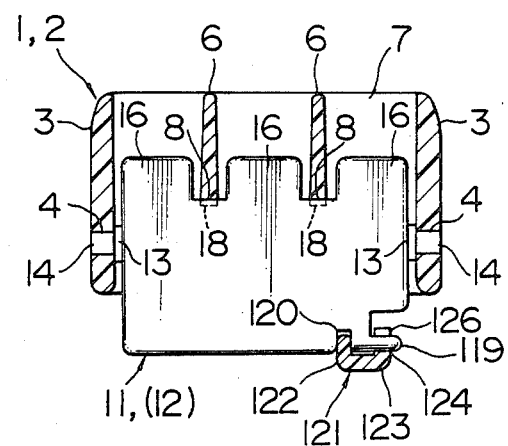
FIG. 9 is a cross-sectional view of the ventilator grill shown in FIG. 7.
Figure 10:
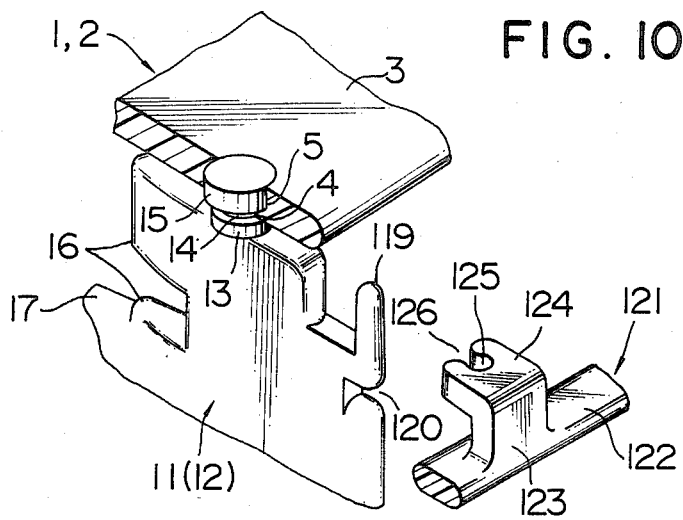
FIG. 10 is a partially fragmentary perspective view showing a part of the ventilator grill shown in FIG. 7.

FIG. 6 shows another modification of the ventilator grill. Engaging members 35 are formed integrally with both sides of the arcuate recess 8 of the stationary vane 6 of the outer frame 1. Recesses 8b are formed in the engaging members 35 along the locus 32 of the opposing portion 18 of the movable vane 11 as in the recess 8. At least one projection 36 is formed on the recess 8b and the opposing portion 18 of the movable vane 11 is retained at one of the projections 36, thereby holding the movable vane 11 in a click stop manner.

In the modifications shown in FIGS. 5 and 6, if a width of the stationary vanes 6 is extended toward the movable vanes 11, it is unnecessary to form the engaging members 31 and 35. It is sufficient to simply form the recesses 8, 8a and 8b.

In the abovementioned embodiments, a part of the edge portion of the stationary vane 6 of the outer side wall 3 of the outer frame 1 is in the form of an arc, which is used as a cavity surface of the complete mold for moulding the movable vanes 11. However, in case that a thickness of the movable vane 11 is thin and has a large amount of shrinkage, a gap between the front edge portion of the movable vane 11 and the rear edge portion of the stationary vane 6 permits the movable vane 11 to rotate, which is caused by the shrinkage of the movable vane 11 after molding. Accordingly it is not always to provide arc recess means onto the stationary vane 6.

Referring now to FIGS. 7 through 10, a ventilator grill according to another embodiment of the invention will be described. In FIGS. 7 to 10, the same reference numerals used in the preceding embodiments are used to designate the like components or members. In the embodiment shown in FIGS. 7 to 10, by cutting away parts of a corner portion of each movable vane 11, a pin portion 119 in parallel with a center of swing of each movable vane 11 is integrally formed along a rear edge of each movable vane 11. A recess portion 120 is formed as a pull-apart preventing portion at a rear edge portion of each movable vane 11 and is located on an extending line of a proximal end side of each pin portion 119. A diameter of each pin portion 119 is equal to or smaller than a thickness of the movable vane 11.

A longitudinal cooperating rod 121 is made of synthetic resin. Substantially L-shaped (in side elevation) five connecting portions 124 having spacing portions 123 extending from the edge of a plate-like body portion 122 of the cooperating rod 121 are formed at a predetermined interval in the longitudinal direction in the cooperating rod 121. The cooperating rod 121 as a whole has a substantially U-shaped side elevation. A hole 125 engaging with the pin portion 119 of each movable vane 11 is formed in the connecting portion 124. An opening portion 126 having a width smaller than the diameter of the pin portion 119 is formed at a free end of each connecting portion 124 from the hole 125. The pin portion 119 of each movable vane 11 is rotatably inserted into the hole 125 of each connecting portion 124. With such a structure, the respective movable vanes 11 are moved in cooperation with each other while constituting a part of a parallelepiped link mechanism. The respective movable vanes 11 are swung always in a parallel state.

The body portion 122 of the cooperating rod 121 serves as the pull-apart preventing portion and engages with the recess portions 120 of the respective movable vanes 11 to be slidable in the longitudinal direction of the cooperating rod 121. As a result, each connecting portion 124 of the cooperating rod 121 is prevented from being pulled apart from the pin portion 119 of the associated movable vane 11 in the axial direction thereof.

A method of assembling and molding the ventilator grill shown in FIGS. 7 to 10 will be described hereinunder.

Figure 11:
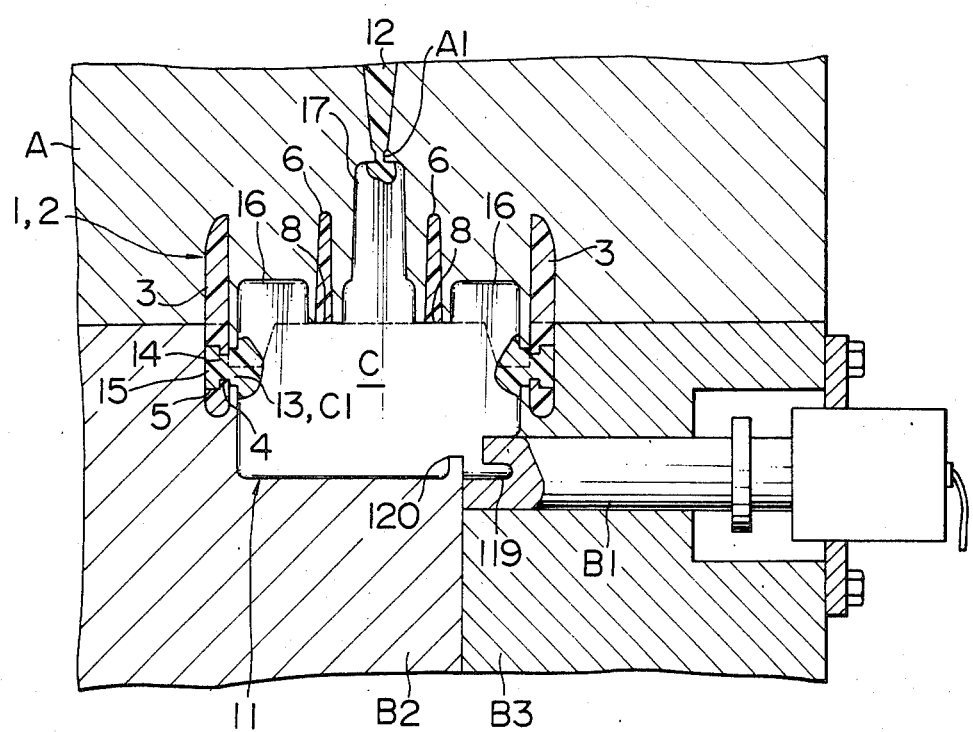
FIG. 11 is a cross-sectional view of mold in a molding and assembling state of the ventilator grill shown in FIG. 7.

FIG. 11 shows a state in which each movable vane 11 is injection molded of PP resin 12 within the interior of the mold A+B and simultaneously therewith, the each movable vane 11 is assembled with the outer frame 1 which has been injection molded in advance of ABS resin 2.

The outer frame 1 injection molded of ABS resin is inserted into one of the mold halves A and B and is closed by the other.

Five cavities C for molding the respective movable vanes 11 (including the flanged portions 13, the extensions 16, the operating member 17 of the central movable vane 11 and the pin portions 119) are formed in the mold A+B in parallel with the outer side walls 7 of the outer frame 1. The recess portions 8 of each stationary vane 6 of the outer frame 1 are exposed at an upper edge of each cavity C. Portions $C_1$, for molding the opposite flanged portions 13, of each cavity C are in communication with the through holes 4 of the outer side walls 3 of the outer frame 1 (including the greater diameter portions 5 of the central through hole 4). The recess portions 8 of the respective stationary vanes 6 of the outer frame 1 and the through holes 4 of the outer side wall 3 of the outer frame 1 are used to form parts of the cavity surface of the mold A+B. A parting line of the mold halves A and B is located on a center line of the portions $C_1$ for releasing the flanged portions 13 of each cavity C from the mold.

In the mold B, a slide pin $B_1$ is provided at a lower end portion of each cavity C. Each pin portion 119 is molded by the associated slide pin $B_1$. In order to provide the slide pins $B_1$, the mold half B is constituted by two sections $B_2$ and $B_3$.

A gate $A_1$ is provided in the mold half A and an ejector pin (not shown) is provided in the mold half B.

In such an arrangement, when the PP resin 12 which has no bondability against the ABS resin 2 of the outer frame 1 and is molten at a temperature lower than a melting point of the ABS resin 2 is injected into each cavity C from the gate $A_1$ of the mold half A, the respective movable vanes 11 (including the flanged portions 13, the extensions 16, the operating member 17 of the central movable vane 11 and the pin portions 119) are molded. Further, the PP resin 12 is pressed into the through holes 4 of the outer side wall 3 of the outer frame 1 (including the greater diameter portions 5 of the central through hole 4) so that the shafts 14 (including the flanged portions 15 of the shafts 14 of the central movable vane 11) are integrally molded with the respective movable vane 11. Thus, the ventilator grill (other than the cooperating rod 121) shown in FIGS. 7 to 10 is molded.

After the injected PP resin 12 has been solidified, when the mold halves A and B are separated from each other, the ventilator grill is released apart from the mold half A and simultaneously, the PP resin 12 is cut at the gate $A_1$. Subsequently, after the respective slide pins $B_1$ are retracted from the pin portions 119, when the ejector pin (not shown) is raised, the ventilator grill is released apart from the mold half B.

In the thus assembled ventilator grill, due to the shrinkage of the PP resin 12 after the molding, gaps are formed not only between the outer surfaces of the shafts 14 of the respective movable vanes 11 (including the flanged portions 15 of the shafts 14 of the central movable vane 11) and the inner surfaces of the through holes 4 of the outer side walls 3 of the outer frame 1 (including the greater diameter portions 5 of the central through holes) but between the arcuate portions 18 of the respective movable vanes 11 and the arcuate recess portions 8 of the stationary vanes 6 of the outer frame 1, respectively. Therefore, there is no hindrance in rotation of the respective movable vanes 11. Furthermore, the end faces of the flanged portions 15 of the shafts 14 of the central movable vane 11 are held in press contact with side faces of the greater diameter portions 5 of the central through holes 4 of the outer side walls 3 of the outer frame 1 to thereby impart a suitable resistive rotational torque to the respective movable vanes 11.

As described before, also, in the last-mentioned embodiment, one of the mold halves A may be used not only for molding the respective movable vanes 11 and the like but also the outer frame 1. For example, as shown in Japanese Patent Unexamined Publication No. 70627/82, after the outer frame 1 has been molded in a first position with the mold half A and a third mold half (not shown), the mold halves are opened so as to release the outer frame 1 apart from the third mold half while the outer frame 1 is left in the mold half A, and subsequently, after the mold half A is turned to s second position so as to oppose the mold half B, the mold halves A and B are closed to thereby mold the respective vanes 11 and the like.

Finally, the pin portions 119 are engaged with the holes 125 of the connecting portions 124 independently molded, while the opening portions 126 of the respective connecting portions 124 of the cooperating rod 121 is being pressed against side portions of the pin portions 119, and simultaneously, the body portion 122 of the cooperating rod 121 is engaged with the recess portions 120 of the respective movable vanes 11. Thus, the intended ventilator grill may be completed.

Also, FIGS. 12 and 13 show modifications of the cooperating rod 121. In the modification shown in FIG. 12, an aerial resistance is decreased by making the cross-section of each spacer 123a of the cooperating rod 121 triangular. In the modification shown in FIG. 13, an aerial resistance is decreased by making the cross-section of each spacer 123b of the cooperating rod 121 semicircular.

FIG. 14 shows a modification of the retainer portion for preventing the movable vane 11 from falling apart. A pin portion 119 is substantially in the form of a letter L extending from a rear edge portion of the movable vane 11 through a connecting portion 131. The body portion 122 of the cooperating rod 121 is engaged with an outer side of the connecting portion 131, thereby using the connecting portion 131 as the retainer against the cooperating rod 121.

Also, in the modification shown in FIG. 14, if the extending direction of the pin portion 119 is reversed so that the connecting portion 131 extends from the corner portion of the movable vane 11, the body portion 122 of the cooperating rod 121 is located further outside of the movable vane 11. With such an arrangement, an aerial resistance of the cooperating rod 121 may be further decreased.

In the foregoing embodiment or modifications, the body portion 122 of the cooperating rod 121 is engaged, as the pull-apart preventing portion, with the retaining portion such as the recess portion 120 of the movable vane 11 and the connecting portion 131 thereof. However, the structure is not limited thereto. For instance, a plurality of pairs of holes 125 and opening portions 126 to be engaged with the pin portions 119 of the movable vanes 11 are formed at a predetermined interval on the body portion 122; a plurality of engagement members extending from the edge portion of the body portion 122 through the respective spacers 123 is formed substantially in an L-shape in cross-section; and the respective engagement members can be used as the pull-apart preventing portions and can be engaged with the retaining portions such as the recess portion 120 and the connecting portion 131 of the movable vane 11.

Although, in the preceding embodiments and modifications, the outer frame 1 is made of ABS resin 2 and the movable vanes 11 are made of PP resin 12, the materials are not limited thereto. For instance, the outer frame 1 may be made of high impact polystylene, polyacetal, polycarbonate, polyamid, polyphenylene oxide or the like, and the movable vanes 11 may be made of polyethylene, ethylen-vinyl acetate copolymer or the like.

What is claimed is:

1. A ventilator grill comprising:
   an outer frame made of synthetic resin, said outer frame having an inlet opening and an outlet opening;
   at least one stationary vane integrally molded with and extending across an interior of said outer frame;
   a plurality of through holes provided at opposite sides of said stationary vane on the opposite side walls of said frame, the corresponding holes of said through holes in each side wall being arranged symmetrically;
   arcuate recess means provided in an end face of said stationary vane, which opposes said inlet opening of said outer frame, said arcuate recess means having a circular arc; and
   at least one movable vane formed of a different synthetic resin extending across said stationary vane, said movable vane being provided at opposite sides thereof in opposite side walls of said outer frame with integral journal shafts received within the through holes for permitting said movable vane to swing about an axis of swing, and being provided at one end portion thereof toward said outlet opening of said outer frame with a portion which is in engagement with said arcuate recess means, said axis of swing of said movable vane extending through a center of said circular arc of said arcuate recess means.

2. The ventilator grill according to claim 1, wherein both sides of said arcuate recess means of said stationary vane are formed in such an eccentric arcuate manner that said both sides gradually enter into a rotational path of the opposing end face of said movable vane with distance from a central portion of said arcuate recess means, and said both sides of said arcuate recess means comprises sliding contact means for slidingly contacting against said opposing face of said movable vane.

3. The ventilator grill according to claim 1, wherein at least one projection for entering into a rotational path of the opposing end face of said movable vane is provided on said arcuate recess means of said stationary vane in such a manner that the opposing end face of said movable vane may be click stopped at said projection.

4. The ventilator grill according to claim 1, further comprising:
   integral projection means provided on said movable vane, an axis of said projection means being apart from and parallel to the axis of swing of said movable vane;
   recess means provided in an end face of said movable vane, which opposes said inlet opening of said outer frame; and
   an integral cooperating rod provided with means for retaining said projection means for rotation thereof, and provided with engaging means which is slidingly engaged with said recess means along a longitudinal axis of said cooperating rod.

5. The ventilator grill according to claim 4, wherein a pin portion substantially in the form of an L-shape extends from an edge portion of said movable vane, and said pin portion constitutes said projecting means.

6. The ventilator grill according to claim 5, a connecting portion of said cooperating rod is substantially in the form of an L-shaped extending from an edge portion of a body portion of said cooperating rod through a spacer, a side surface of said cooperating rod is substantially in the form of a U-shape, and the body portion of said cooperating rod constitutes said engaging means.

7. A ventilator grill comprising:
   an outer frame made of synthetic resin, said outer frame having a rectangular inlet opening and a rectangular outlet opening and two pairs of side walls, the side walls of each of said pairs being parallel to each other;
   at least one stationary vane integrally molded with and extending between the side walls of one of said two pairs of side walls, said stationary vane being in parallel to the side walls of the other pair of side walls;
   a plurality of through holes provided on each of the side walls of the other pair of side walls;
   arcurate recess means provided in an end face of said stationary vane, which opposes said inlet opening of said outer frame, said arcurate recess means having a circular arc; and
   at least one movable vane formed of a different resin extending across said stationary vane and between the side walls of said other pair, said movable vane being provided at opposite sides thereof with integral journal shafts received within the through holes for permitting said movable vane to swing about an axis of swing, and being provided at one end thereof opposing said outlet opening of said outer frame with a portion which is in engagement with said arcurate recess means, said axis swing of said movable vane extending through a center of said circular arc of said arcurate recess means.

8. A method for assembling a ventilator grill which includes an outer frame formed from a first synthetic resin, said outer frame having two pairs of side walls, the side walls of each of said pairs being parallel to each other, at least one stationary vane extending between the side walls of a first pair of said pairs of side walls and being parallel to the side walls of said second pair of side walls, and a plurality of through holes provided in each side wall of said second pair of side walls, and at least one movable vane extending across said stationary vane and between the side walls of said second pair of side walls, said method comprising:
   first molding an outer frame of a first synthetic resin in a mold;
   disposing said molded outer frame within a mold half and closing said mold with a second mold half to form a complete mold having a molding cavity, a part of which is defined by a part of an edge surface of said stationary vane and said through holes in said side walls of said outer frame;
   injecting a second synthetic resin, having no bondability to said first synthetic resin and having a melting point lower than that of said first synthetic resin, into said molding cavity, thereby forming in said complete mold cavity and said molded outer frame at least one movable vane extending across said stationary vane in said molded outer frame and journal shafts projecting from each of said opposite sides of said movable vane into said through holes in said side walls for permitting said movable vane to swing in an arc about an axis of said journal shafts; and
   cooling and removing said ventilator grill.

9. The method according to claim 8, wherein a part of an edge portion of said stationary vane of said molded outer frame, used as a cavity surface opposing a part of an edge portion of said movable vane, is molded in said stationary vane of said molded outer frame in the form of an arc corresponding to a rotational path of a part of said movable vane.

10. The method according to claim 8, further comprising integrally molding a plurality of movable vanes, providing integral hinge portions at edge portions opposing the stationary vane, and integrally molding a cooperating rod for connecting and cooperating the plural hinge portions with each other.

11. The method according to claim 8, further comprising integrally molding a plurality of movable vanes and pin portions engaging rotatably with a cooperating rod for cooperating said movable vanes with each other, said pin portions being formed in parallel with the axes of swing of said movable vanes.

* * * * *